United States Patent
Oyama et al.

[11] Patent Number: 5,120,113
[45] Date of Patent: Jun. 9, 1992

[54] RIM-FITTED TIRE AND METHOD OF CORRECTIN31EIGHT IMBALANCE

[75] Inventors: Toshiharu Oyama; Hironobu Fukushima, both of Kodaira, Japan

[73] Assignee: Bridgestone Corporation, Tokyo, Japan

[21] Appl. No.: 686,982

[22] Filed: Apr. 18, 1991

[30] Foreign Application Priority Data

Apr. 22, 1990 [JP] Japan ................. 2-105899
Apr. 30, 1990 [JP] Japan ................. 2-114005
May 15, 1990 [JP] Japan ................. 2-126297

[51] Int. Cl.$^5$ .................................. B60B 21/00
[52] U.S. Cl. ........................... 301/5 BA; 301/5 B
[58] Field of Search ............... 301/5 B, 5 BA; 152/154.1

[56] References Cited

U.S. PATENT DOCUMENTS 3,462,198  8/1969  Onufer ................. 301/5 BA

FOREIGN PATENT DOCUMENTS 0076401  4/1985  Japan ................. 301/5 BA

OTHER PUBLICATIONS

"Gisholt Method of Balancing"; pp. 13-15, Gisholt Machine Company; 19286.

Primary Examiner—Russell D. Stormer
Attorney, Agent, or Firm—Oliff & Berridge

[57] ABSTRACT

A rim-fitted tire witth a weight unbalance corrected in which a plurality of balance weights for correcting static unbalance are attached on an outer peripheral surface of the rim thereof at a substantially central position with respect to the widthwise dimension of the rim. Balance weights are attached at widthwise opposite ends of the rim to correct an amount of static unbalance on the basis of an amount of dynamic unbalance measured in the static-unbalance corrected state. Since the balance weights are attached on the rim in a distributed manner, the weight of each balance weight is made light, hereby reducing the centrifugal force occurring when the tire is actually used on a vehicle.

10 Claims, 5 Drawing Sheets

RIM-FITTED TIRE AND METHOD OF CORRECTIN31EIGHT IMBALANCE

BACKGROUND OF THE INVENTION

1. Field of the Invention

The present invention relates to a rim-fitted tire with its weight unbalance corrected and a method of correcting a weight unbalance of a rim-fitted tire.

2. Description of the Related Art

It is well-known that vibrations occur if a rim-fitted tire with unbalanced weight is rotated. Such an unbalance acts as a couple of forces about a vertical axis parallel with the plane of rotation of the tire, and about a horizontal axis, respectively. The couple of forces acting about the horizontal axis is called static unbalance, while the couple of forces acting about the vertical axis is called dynamic unbalance.

That is, the static unbalance occurs when the center of gravity of the tire is not aligned with the rotating axis, while the dynamic unbalance occurs when there is a weight unbalance on both obverse and reverse surfaces of the tire, and an inertial axis passing through the center of gravity is not aligned with the rotating axis.

As a method of correcting such an unbalance, a method is known in which the static unbalance is first corrected, and then, the correction of the dynamic balance is separately made by rotating the tire and distributing balance weights. Nowadays, however, a method is mainly adopted in which the rim-fitted tire is mounted on a measuring instrument (balancer) and rotated to measure the amount of unbalance requiring correction, and one balance weight is fitted at one location on each of the observe and reverse rim flanges on the basis of that measurement, so as to simultaneously correct the static unbalance and the dynamic unbalance.

However, with this method of simultaneously correcting the weight unbalance, since the rim-fitted tire is rotated and measured on the axis of the balancer, there has been a drawback in that no consideration is given to a ground-contacting condition, i.e., the condition in which the rim-fitted tire is actually used. In addition, weight unbalance exhibits a certain distribution in the rim-fitted tire, and it is readily conceivable that the unbalance is not concentrated in one location. Nevertheless, at the time of making an actual correction of the balance, one balance weight is attached to each of the obverse and reverse sides of the rim (widthwise (axially) opposite ends of the rim) so as to correct the balance.

With this conventional method of correction, however, it cannot be said that a satisfactory correction can always be made since, as described above, it ignores the aspect that the tire rotates in contact with the ground.

More specifically, FIG. 1 schematically shows a rim-fitted tire which is rotated on the axis of a balancer, a balance weight "wa" being attached at a location a indicated by the balancer. In other words, the rim-fitted tire is overweight at a location b on the opposite side thereof.

When the rim-fitted tire is rotated in this state, its centrifugal force is balanced. When the tire is actually in contact with the ground, however, this balance does not hold.

FIG. 2 shows a state in which such a tire is actually mounted on a vehicle and is in contact with the ground.

That is, at points a and b located symmetrically about the center of the rim, an additional centrifugal force is created by the balance weight placed at the point a with the tire contacting the ground at the point b, so that vertical vibrations (moment acting in the direction of arrow A) and horizontal vibrations (moment acting in the direction of arrow B) occur in the tire.

To sum up, if the conventional balancing method is adopted, although vibrations can be controlled to a certain degree, a satisfactory remedy is not provided since the balance with respect to the tire contacting the ground is not taken into consideration.

SUMMARY OF THE INVENTION

Accordingly, it is an object of the present invention to provide a rim-fitted tire whose weight unbalance is corrected to minimize vertical and horizontal vibrations of the tire, as well as a method of correcting weight unbalance of a rim-fitted tire by taking into consideration a situation in which the tire is actually used, thereby overcoming the above-described drawback of the conventional art.

To this end, in accordance with a first aspect of the invention, there is provided a rim-fitted tire with a weight unbalance corrected, comprising: at least two balance weights attached to an outer peripheral surface of the rim thereof in the vicinity of a widthwise central portion of the rim so as to correct static unbalance; and an additional balance weight attached to the vicinity of a widthwise end portion of the rim so as to correct both static and dynamic unbalances on the basis of an amount of dynamic unbalance measured with the at least two balance weights attached.

In accordance with a second aspect of the invention, there is provided a rim-fitted tire with a weight unbalance corrected, comprising: three balance weights two of which are attached to an outer peripheral surface of a rim in such a manner as to be located in a plane substantially parallel with an equatorial plane of the rim-fitted tire defined at a substantially central position in a widthwise direction of the rim, and so as to be located at substantially symmetrical positions spaced apart from each other at an angle of 40° to 50° as measured from the center of the rim-fitted tire, a central one of the balance weights having the heaviest weight being disposed between the two balance weights just mentioned, and all three of the balance weights being arranged to correct static unbalance; and an additional balance weight attached to the vicinity of a widthwise end portion of the rim so as to correct both static and dynamic unbalances on the basis of an amount of dynamic unbalance measured with the balance weights for correcting static unbalance attached.

In accordance with a third aspect of the invention, there is provided a rim-fitted tire according to the second aspect of the invention, wherein the central balance weight having the heaviest weight is attached to a measured unbalanced position, and its weight is approximately one half of the amount of unbalance to be corrected by the balance weights, while the weight of each of the remaining balance weights of the three balance weights is approximately one third of the amount of unbalance.

In accordance with a fourth aspect of the invention, there is provided a rim-fitted tire with a weight unbalance corrected, comprising: at least two first balance weights which, on the basis of positions ($p_1$, $p_2$) of attachment of two virtual balance weights at widthwise opposite ends of a rim of the rim-fitted tire and the weight ($w_1$, $w_2$) of the two virtual balance weights that are calculated by an unbalance measuring instrument, as well as a plane P substantially parallel with an equatorial plane of the rim-fitted tire defined at a substantially central position in a widthwise direction of the rim, are respectively attached at positions ($p_1'$, $p_2'$) of intersection between the plane P and lines extending from the positions ($p_1$, $p_2$) perpendicularly to the plane P in conformity with a surface of the rim, each of the first balance weights having weight equal to or less than the weight ($w_1$, $w_2$) of each of the virtual balance weights; a second balance weight attached at a predetermined position in the plane P so as to correct an amount of static unbalance determined by means of either a balancer or calculation, with the first balance weights attached; and two third balance weights attached to the widthwise opposite ends of the rim, respectively, so as to correct an amount of dynamic unbalance on the basis of the amount of dynamic unbalance measured with all of the first and second balance weights attached.

In accordance with a fifth aspect of the invention, there is provided a rim-fitted tire with a weight unbalance corrected, comprising: a plurality of balance weights that are arranged consecutively in one direction starting with one having the heaviest weight, about a static unbalance correcting position in a plane substantially parallel with an equatorial plane of the rim-fitted tire defined at a substantially central position with respect to the widthwise dimension of the rim thereof, so as to correct static unbalance; and an additional balance weight attached to the vicinity of a widthwise end of the rim so as to correct amounts of static and dynamic unbalances on the basis of an amount of dynamic unbalance measured with the previously mentioned plurality of balance weights attached.

In accordance with a sixth aspect of the invention, there is provided a rim-fitted tire according to the fifth aspect of the invention, wherein the plurality of balance weights comprise balance weights each having weight $m_n$ (gr) satisfying the following formulae:

$m_n = 5 \times a$ (a, n: positive integers)

$(m_{n-1}/2) + 5 > m_n > (m_{n-1}/2)$ and two balance weights of 10 gr.

In accordance with a seventh aspect of the invention, there is provided a rim-fitted tire according to the sixth aspect of the invention, wherein if it is assumed that an origin indicated by a measuring instrument is set as $\theta = 0$, a counterclockwise direction is set as positive, and the weight of a balance weight indicated by the measuring instrument is $m_0$ (gr), the position of attachment of each of the plurality of balance weights is a position shown in Table 1 below with respect to an amount of static unbalance of 10 to 99 gr under the condition of

TABLE 1

$\theta_1 = \cos^{-1}(m_0/2m_1)$

| Amount of static unbalance $m_0$ (gr) | Balance-weight attaching position | | | | | |
|---|---|---|---|---|---|---|
| | $\theta_1$ | $\theta_2$ | $\theta_3$ | $\theta_4$ | $\theta_5$ | $\theta_6$ |
| 10–19 | $\cos^{-1}(m_0/20)$ | $60-\theta_1$ | | | | |
| 20–29 | $\cos^{-1}(m_0/30)$ | $41.4-\theta_1$ | $-82.8-\theta_1$ | | | |
| 30–39 | $\cos^{-1}(m_0/40)$ | $48.2-\theta_1$ | $-6.8-\theta_1$ | $-89.6-\theta_1$ | | |
| 40–49 | $\cos^{-1}(m_0/50)$ | $33.6-\theta_1$ | $7.9-\theta_1$ | $-75-\theta_1$ | | |
| 50–59 | $\cos^{-1}(m_0/60)$ | $41.4-\theta_1$ | $6.8-\theta_1$ | $-48.2-\theta_1$ | $-131-\theta_1$ | |
| 60–69 | $\cos^{-1}(m_0/70)$ | $29-\theta_1$ | $+19.2-\theta_1$ | $-35.7-\theta_1$ | $-118.6-\theta_1$ | |
| 70–79 | $\cos^{-1}(m_0/80)$ | $36.9-\theta_1$ | $-3.3-\theta_1$ | $-29-\theta_1$ | $-111.9-\theta_1$ | |
| 80–89 | $\cos^{-1}(m_0/90)$ | $25.9-\theta_1$ | $-18.1-\theta_1$ | $-43.8-\theta_1$ | $-23.3-\theta_1$ | |
| 90–99 | $\cos^{-1}(m_0/100)$ | $33.6-\theta_1$ | $-15.7-\theta_1$ | $-50.3-\theta_1$ | $-105.3-\theta_1$ | $0.3-\theta_1$ |

In accordance with an eighth aspect of the invention, there is provided a method of correcting weight unbalance of a rim-fitted tire, comprising the steps of: defining a plane P substantially parallel with an equatorial plane of the rim-fitted tire at a substantially central position of a rim in a widthwise central position thereof; measuring an amount of static unbalance W of the rim-fitted tire and a position $p_0$ at which a balance weight is to be attached in the plane P; attaching a weight $w_0$ having a weight of approximately one half of W, to the position $p_0$, and attaching balance weights $w_1$, $w_2$, each having weights of approximately one third of W, on respective sides of the position $p_0$ within the plane P, at substantially symmetrical positions $p_1$, $p_2$ spaced apart from each other at respective angles of approximately 40° to 50°, as measured from the radial center of the rim-fitted tire, in order to correct static unbalance; measuring dynamic unbalance; and attaching a balance weight to each of the widthwise opposite ends of the rim.

In accordance with a ninth aspect of the invention, there is provided a method of correcting weight unbalance of a rim-fitted tire, comprising the steps of: measuring positions ($p_1$, $p_2$) of attachment of two virtual balance weights at widthwise opposite ends of a rim of the rim-fitted tire, and determining the weights ($w_1$, $w_2$) of the two virtual balance weights by means of an unbalance measuring instrument; defining a plane P substantially parallel with an equatorial plane of the rim-fitted tire at a substantially central position in a widthwise direction of the rim; attaching at least two first balance weights at positions ($p_1'$, $p_2'$) of intersection between the plane P and lines extending from the positions ($p_1$, $p_2$) perpendicularly to the plane P in conformity with a surface of the rim, each of the first balance weights having weight equal to or less than the respective weights ($w_1$, $w_2$) of the virtual balance weights; determining an amount of static unbalance by means of either a balancer or calculation, with the first balance weights attached, and attaching a second balance weight at a predetermined position in the plane P so as to correct static unbalance; and measuring an amount of dynamic unbalance and attaching two third balance weights at the widthwise opposite ends of the rim, respectively, so as to correct the amount of dynamic unbalance.

In accordance with a tenth aspect of the invention, there is provided a method of correcting weight unbalance of a rim-fitted tire, comprising the steps of: defining a plane P substantially parallel with an equatorial plane of the rim-fitted tire at a substantially central position in a widthwise direction of the rim; measuring a correcting position $p_0$ for attachment of a virtual balance weight $w_0$ and the weight $m_0$ of the virtual balance weight in the plane by means of a static-unbalance measuring instrument; attaching a balance weight $w_1$ at a position offset from the corrected position, the balance weight $w_1$ having a weight $m_1$ of not less than half the weight $m_0$ of the virtual balance weight; attaching a balance weight $w_2$ at a position symmetrical about the correcting position $p_0$ for attachment with respect to the position where the balance weight $w_1$ is attached, the balance weight $w_2$ having weight $m_2$ of not less than the weight of the balance weight $w_1$; consecutively attaching a plurality of balance weights $m_n$ in the above weights each having weight $m_n$ (gr) satisfying the following formulae:

$$m_n = 5 \times a \ (a, n: \text{positive integers})$$

$$(m_{n-1}/2) + 5 > m_n > (m_{n-1}/2)$$

and two balance weights of 10 gr, the plurality of balance weights being arranged in the plane P consecutively in one direction starting with one having the heaviest weight, so as to correct static unbalance; and attaching a balance weight for correcting an amount of dynamic unbalance.

In accordance with the first, fourth, and ninth aspects of the invention, in order to reduce the moment which produces horizontal vibrations occurring when the tire is in contact with the ground, the balance weight for correcting static unbalance and the balance weight for correcting dynamic unbalance are separated to reduce the weight of the balance weights for correcting unbalance which are attached to peripheral portions of the rim (usually on flanges), thereby making lightweight the balance weight for correcting dynamic unbalance. Meanwhile, in order to reduce the moment which produces vertical vibrations occurring when the tire is in contact with the ground, the balance weight for correcting static unbalance (which is attached on an inner peripheral surface of the rim and for which only one balance weight is generally used) is attached to the rim by being divided into two or more balance weights each having weight equal to the weight of a normally attached balance weight (virtual balance weight) or about, for instance, 60% less than the same.

By virtue of the above-described arrangement, it becomes possible to eliminate balance weights which produce a large centrifugal force.

In accordance with the second, third, and eighth aspects of the invention, in order to reduce the moment which produces horizontal vibrations occurring when the tire is in contact with the ground, the balance weight for correcting static unbalance and the balance weight for correcting dynamic unbalance are separated to reduce the weight of the balance weights for correcting unbalance which are attached to peripheral portions of the rim (usually on flanges), thereby making lightweight the balance weight for correcting dynamic unbalance. Meanwhile, in order to reduce the moment which produces vertical vibrations occurring when the tire is in contact with the ground, the balance weight for correcting static unbalance (which is attached on an inner peripheral surface of the rim and for which only one balance weight is generally used) is attached to the rim by being divided into three balance weights each having weight lighter than the weight of a normally attached balance weight (virtual balance weight).

It should be noted that the term "approximately" used herein and in the appended claims in connection with the weight of the balance weight generally means a range of ±5 g or thereabouts although it depends on the magnitude of the weight, and fractions are normally either rounded up or rounded off.

If the interval between adjacent balance weights is smaller than 40°, there are cases where two balance weights are present inside a triangle formed by joining respective ends of the ground-contacting surface of the tire and the tire center, as will be described later, and such a case is utterly undesirable as a variation of the present invention. On the other hand, if the interval becomes greater than 50°, the balance weights attached at symmetrical positions are required to have large weight, so that this is also undesirable.

Here, if a case in which an amount of unbalance is 30 g is considered and if it is assumed that 15 g is attached at the center, balance weights having the weight shown in Table 2 below become necessary at the positions symmetrical about that center. Hence, an increase in the angle of symmetry results in the increased weight of the balance weight, so that it is not desirable.

TABLE 2

| Angle of symmetry | 40 | 45 | 50 | 60 | 70 | 80 | 85 |
|---|---|---|---|---|---|---|---|
| Balance weight (gr) | 10 | 11 | 12 | 15 | 22 | 43 | 86 |

In accordance with the fifth, sixth, seventh, and tenth aspects of the invention, in order to reduce the weight of the balance weight for correction, the balance weight for correcting static unbalance and the balance weight for correcting dynamic unbalance are separated to make lightweight the balance weights for correcting dynamic unbalance. Meanwhile, in order to reduce the variation of a centrifugal force which produces vertical vibrations occurring when the tire is in contact with the ground, the balance weights are attached to the inner peripheral surface of the rim by being distributed in such a manner that the centrifugal force of the portion of the tire which is not in contact with the ground is also distributed, during the rotation of the rim-fitted tire while contacting the ground.

Table 3 below shows combinations of balance weights to be attached in cases where the static unbalance ranges from 10 gr to 99 gr.

TABLE 3

| Static unbalance | Distributed balance weights (gr) | | | | | |
|---|---|---|---|---|---|---|
| $m_0$ (gr) | $m_1$ | $m_2$ | $m_3$ | $m_4$ | $m_5$ | $m_6$ |
| 10–19 | 10 | 10 | — | — | — | — |
| 20–29 | 15 | 10 | 10 | — | — | — |
| 30–39 | 20 | 15 | 10 | 10 | — | — |
| 40–49 | 25 | 15 | 10 | 10 | — | — |
| 50–59 | 30 | 20 | 15 | 10 | 10 | — |
| 60–69 | 35 | 20 | 15 | 10 | 10 | — |
| 70–79 | 40 | 25 | 15 | 10 | 10 | — |
| 80–89 | 45 | 25 | 15 | 10 | 10 | — |
| 90–99 | 50 | 30 | 20 | 15 | 10 | 10 |

Since the balance weights that are attached are distributed in units of 5 gr, the positions to which they are distributed are determined as follows:

If it is assumed that the position of the balance weight $w_0$ measured by the balancer is set as $\theta = 0$, and the weight of the balance weight $w_0$ to be attached at this position is $m_0$, an unbalance waveform y can be expressed by $$y = -m_0 \sin\omega t$$

However, to distribute the balance weights in actuality, if the balance weight $w_1$ is set at the position of $\theta_1 = \cos^{-1}(m_0/2m_1)$, the unbalance waveform y can be expressed by $$y = -m_0 \sin(\omega t - \theta_1)$$

The positions of balance weights $w_2$, $w_3$, ... are consecutively set by calculating the above relation with respect to each balance weight as follows:

$$\theta_1 + \theta_2 = \cos^{-1}(m_1/2m_2)$$

$$2\theta_1 + \theta_2 + \theta_3 = \cos^{-1}(m_2/2m_3)$$

...

...

In terms of a general formula, the relation between $\theta_n$ and $\theta_{n-1}$ satisfies $$\theta_n + \theta_{n-1} = \cos^{-1}(m_{n-1}/2m_n) - 2\cos^{-1}(m_{n-2}/2m_{n-1})$$

It should be noted that as for the position where the balance weight is actually attached, a deviation of $\pm 5°$, preferably $\pm 3°$ or thereabouts, with respect to the aforementioned position (angle) is considered to be an allowable range.

Table 1 above shows the positions where the balance weights are attached on the basis of the foregoing relation.

DESCRIPTION OF THE PREFERRED EMBODIMENTS

First, a more detailed description will be given of the conventional case of a balance weight for correcting static unbalance.

Figure 1:
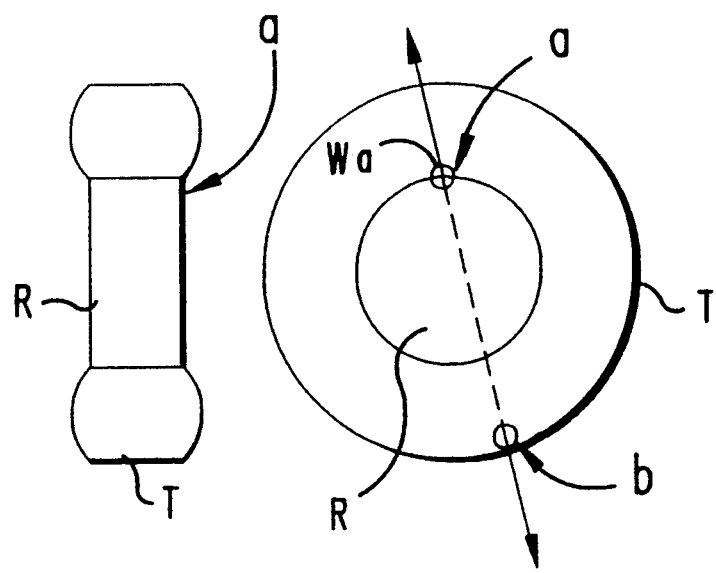
FIG. 1 is a diagram schematically illustrating the behavior of a tire whose unbalance is corrected by a conventional method.

In FIG. 1, a balance weight wa for correcting static unbalance is fitted at the position a measured and designated on the rim, and in this state the centrifugal forces are balanced with the rim as a center, so that there is no problem.

Figure 2:
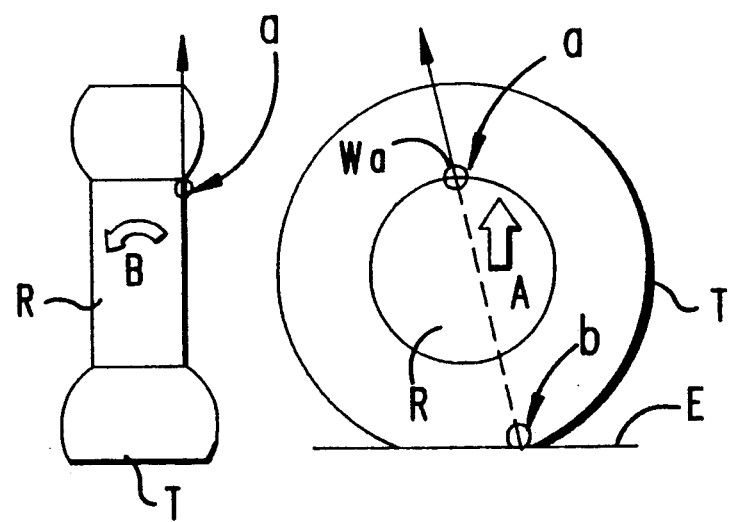
FIG. 2 is a diagram schematically illustrating the behavior of the tire whose unbalance is corrected by the conventional method.

However, if the rim-fitted tire is mounted on a vehicle and when the balance weight at the point a is located on the upper side away from the contacting ground, as shown in FIG. 2, the tire is in contact with the ground at the point b, so that the balance weight at this point b does not produce a centrifugal force. Hence, the centrifugal force is produced only by the balance weight wa at the point a between the points a and b. Accordingly, when the tire is in contact with the ground, the centrifugal force varies each time the tire is rotated, so that the tire undergoes vertical vibration. In the drawings, reference character T denotes the tire; R, the rim; and R, the ground.

Such vertical vibration is caused by the centrifugal force, and is proportional to the weight of the balance weight. Accordingly, by distributing the balance weight, it is possible to reduce the centrifugal force which causes the vertical vibration.

As for the balance-weight attaching position which is measured, it is not that the tire is too light only at this point, but rather the lightness is generally distributed over a certain range, and therefore, the balance weights can be distributed in the manner according to the present invention.

Figure 4:
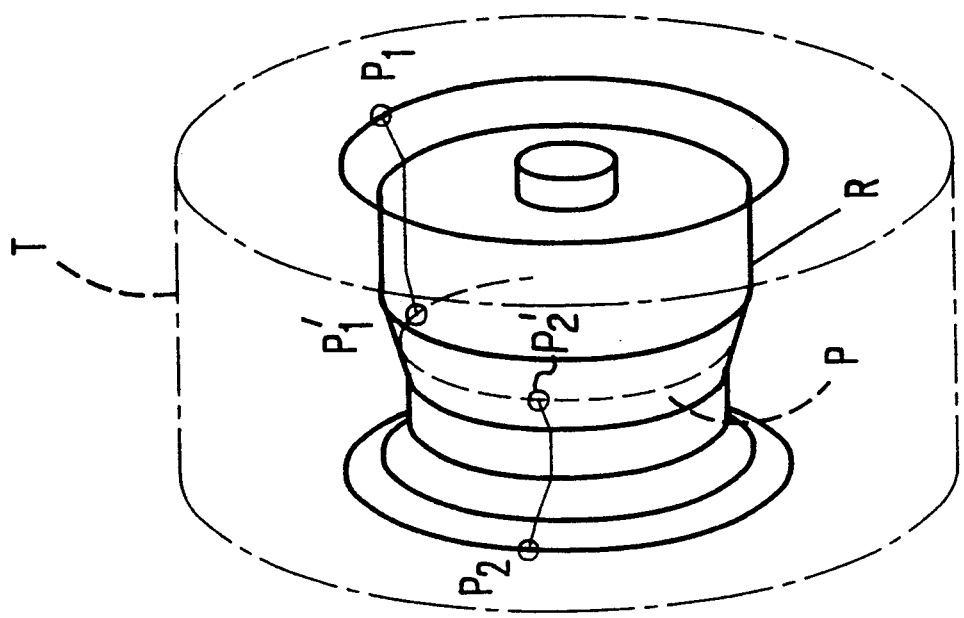
FIG. 4 is a diagram illustrating the correcting method in accordance with the first embodiment of the present invention.
Figure 3:
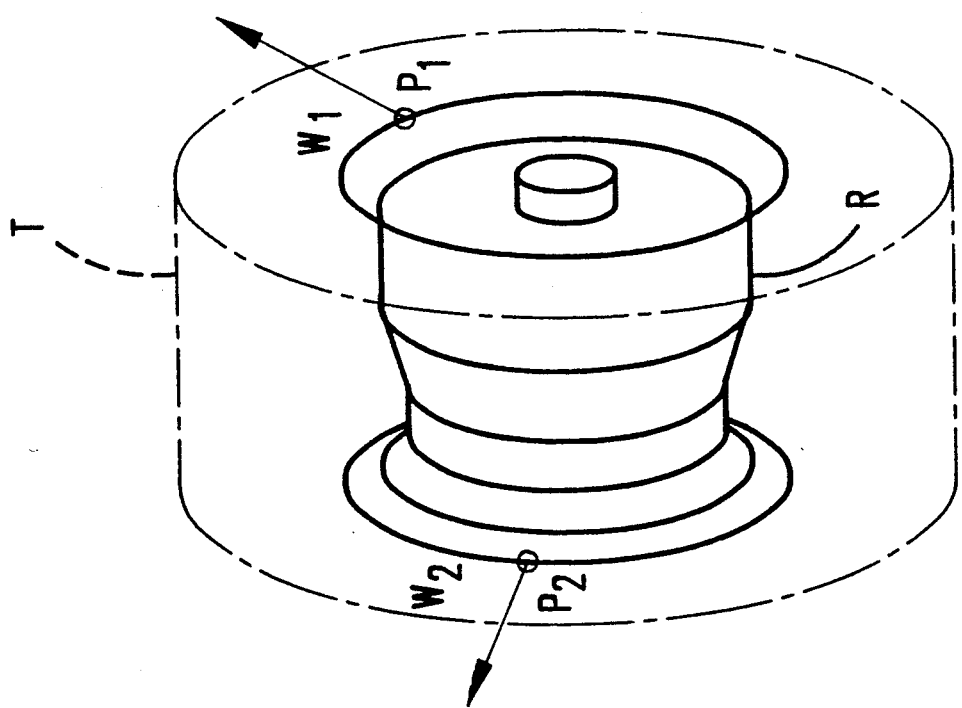
FIG. 3 is a diagram illustrating a correcting method in accordance with a first embodiment of the present invention.
Figure 5:
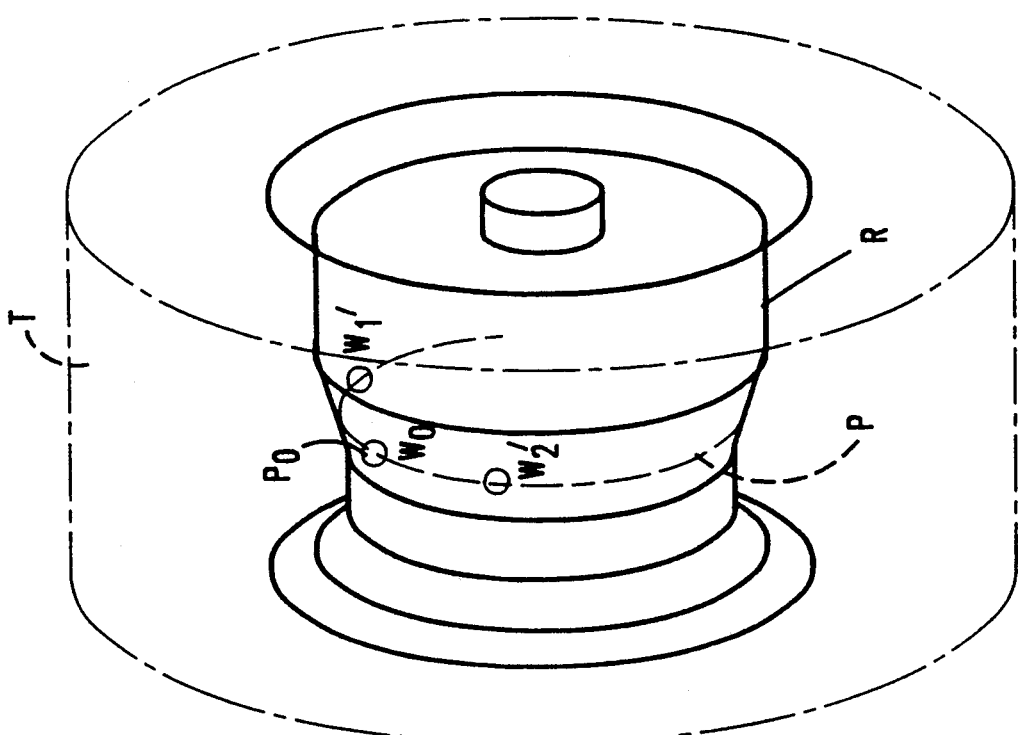
FIG. 5 is a diagram illustrating the correcting method in accordance with the first embodiment of the present invention.

FIGS. 3 to 6 show a correcting method in accordance with a first embodiment. In FIG. 3, positions of attachment of virtual balance weights $w_1$, $w_2$ at two locations $p_1$, $p_2$ on a rim flange are first measured. Then, as shown in FIG. 4, a plane P which is parallel with the equatorial plane of the tire and is positioned substantially at the center in the widthwise direction of the rim is defined, and positions $p_1'$, $p_2'$ which are on extensions of lines perpendicular to the plane P passing through the locations $p_1$, $p_2$ are set, respectively. As shown in FIG. 5, balance weights $w_1'$, $w_2'$ whose respective weights are equal to or lighter than the corresponding virtual balance weights $w_1$, $w_2$, are attached at these positions in a distributed manner, and then with these balance weights $w_1'$, $w_2'$ attached, the static unbalance is measured. Subsequently, the static unbalance is corrected by similarly attaching a correcting balance weight $w_0$ at a position $p_0$ located in the plane P.

Figure 6:
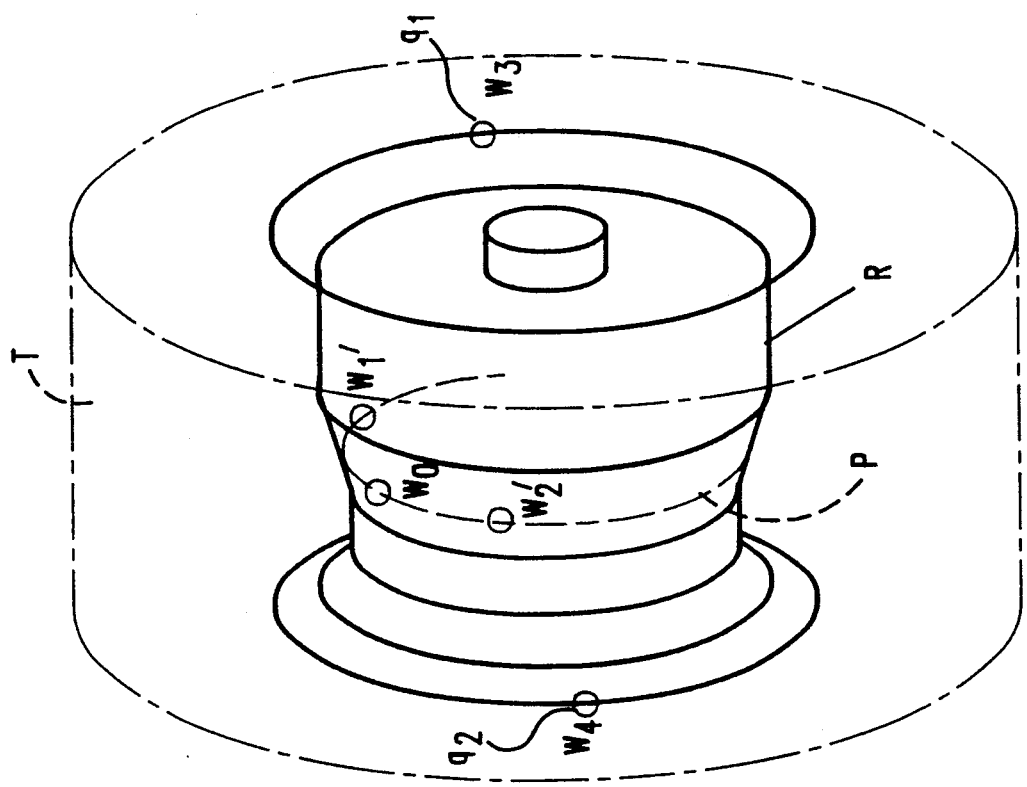
FIG. 6 is a diagram illustrating the correcting method in accordance with the first embodiment of the present invention.

Finally, as shown in FIG. 6, an amount of dynamic unbalance is measured, and balance weights $w_3$, $w_4$ are attached generally at positions $q_1$, $q_2$ on flanges disposed on the obverse and reverse sides of the rim (the outer and inner sides thereof when the tire is mounted on the vehicle), so as to correct the amount of unbalance.

An arrangement may be alternatively provided such that an amount of unbalance required for correction is measured by rotating the tire by means of the balancer, a correcting balance weight whose weight is lighter than the required amount is attached to substantially the widthwise central position of the rim, and then the static unbalance is corrected by measuring an amount of unbalance by means of the balancer and fitting another balance weight so as to obtain a balance. Then, the overall amount of unbalance may be corrected by measuring an amount of dynamic unbalance and fitting a balance weight on the flange of each of the obverse and reverse sides of the rim.

Evaluation Using Actual Vehicles

A subjective (feeling) evaluation test was conducted by using actual vehicles. Two items were tested, steering performance and stability on both a dry road surface and a wet road surface.

Specifically, the high-speed straight advancing characteristic and the lane-changing behavior were tested, and the subjective test was conducted by using actual vehicles on the basis of 100 points with Comparative Example 1 serving as a control example, points greater than 100 indicating the direction of improvement.

The range of evaluation is such that a difference of five points allows a driver having ordinary driving skills to discern a difference in performance.

An overall evaluation was given by incorporating the evaluation of the aforementioned items on the wet road surface and riding comfort into the evaluation of the items on the dry road surface.

As test vehicles, the following two models were used.

Vehicle A: Nissan Skyline GTS-t (1989 Model), rim used: 6 1/2J × 16, tire size: 205/55R16 88V.

Vehicle B: Volkswagen Golf GTI (1988 Model), rim used: 6J × 14, tire size: 185/60R14 82H.

The method of correcting the unbalance of the weight of the rim-fitted tire is shown in Tables 4 and 5, in which Table 4 shows examples of tires for vehicle A, while Table 5 shows examples of tires for vehicle B.

TABLE 4

| Weight-balance fitting position | Specific Example 1 | | Specific Example 1' | | Comparative Example 1 | |
|---|---|---|---|---|---|---|
| | Angle (degree) | Weight (gr) | Angle (degree) | Weight (gr) | Angle (degree) | Weight (gr) |
| Tire 1 | | | | | | |
| Obverse side in the widthwise direction of the rim | 151 | 7 | 151 | 7 | 45 | 10 |
| Reverse side in the widthwise direction of the rim | 331 | 7 | 331 | 7 | 0 | 20 |
| Center in the widthwise direction of the rim | 45 15 0 | 5 14 10 | 30 0 | 20 10 | — | |
| Tire 2 | | | | | | |
| Obverse side in the widthwise direction of the rim | 133 | 13 | 133 | 13 | 100 | 20 |
| Reverse side in the widthwise direction of the rim | 313 | 13 | 313 | 13 | 0 | 15 |
| Center in the widthwise direction of | 100 72 0 | 10 11 10 | 72 0 | 20 14 | — | |

TABLE 4-continued

| Weight-balance fitting position | Specific Example 1 | | Specific Example 1' | | Comparative Example 1 | |
|---|---|---|---|---|---|---|
| | Angle (degree) | Weight (gr) | Angle (degree) | Weight (gr) | Angle (degree) | Weight (gr) |
| the rim | | | | | | |

TABLE 5

| Weight-balance fitting position | Specific Example 2 | | Specific Example 2' | | Comparative Example 2 | |
|---|---|---|---|---|---|---|
| | Angle (degree) | Weight (gr) | Angle (degree) | Weight (gr) | Angle (degree) | Weight (gr) |
| Tire 3 | | | | | | |
| Obverse side in the widthwise direction of the rim | 117 | 8 | 117 | 8 | 80 | 15 |
| Reverse side in the widthwise direction of the rim | 297 | 8 | 297 | 7 | 0 | 10 |
| Center in the widthwise direction of the rim | 80 41 0 | 10 7 5 | 41 0 | 10 8 | — | |
| Tire 4 | | | | | | |
| Obverse side in the widthwise direction of the rim | 142 | 4 | 142 | 4 | 30 | 10 |
| Reverse side in the widthwise direction of the rim | 322 | 4 | 322 | 4 | 0 | 15 |
| Center in the widthwise direction of the rim | 30 15 0 | 5 10 10 | 17 0 | 15 10 | — | |

It should be noted that the radial position (angle) where each balance weight was attached was measured counterclockwise as viewed from the reverse side of the rim-fitted tire mounted on the vehicle, and its origin was set as the position where the balance weight was attached on the reverse side of the rim in the case where both static and dynamic balances were corrected simultaneously. In the above tables, the comparative examples are those in which the static and dynamic balances were corrected simultaneously.

The results of the test conducted by mounting the above tires are shown in Table below.

TABLE 6

| Test Item | Vehicle A (Skyline) | Vehicle B (Golf) |
|---|---|---|
| High-speed straight advancing characteristic: | | |
| Specific Examples 1, 2 | 105 | 105 |
| Specific Examples 1', 2' | 104 | 104 |
| Comparative Examples 1, 2 | 100 | 100 |
| Lane-changing behavior: | | |
| Specific Examples 1, 2 | 106 | 107 |
| Specific Examples 1', 2' | 105 | 105 |
| Comparative Examples 1, 2 | 100 | 100 |
| Overall evaluation: | | |
| Specific Examples 1, 2 | 108 | 110 |
| Specific Examples 1', 2' | 106 | 108 |
| Comparative Examples 1, 2 | 100 | 100 |

As can be seen from the above table, in both high-speed straight advancing performance and lane-changing behavior, the results of the test far surpassed the levels of the comparative examples, and it thus become evident that the method of the first embodiment brings about results of such a measure that the difference can be bodily sensed by ordinary drivers.

The advantage of the first embodiment is large, particularly in the overall evaluation which incorporates performance on a wet road surface.

That is, as compared with the conventional method of correcting unbalance, with the tire corrected in accordance with the method of this embodiment, as the tire is rotated in contact with the ground after being mounted on the vehicle, horizontal and vertical vibrations occurring in the tire are reduced. As a result, a decline in lateral forces produced by the tire due to such vibrations can be suppressed, so that the steering performance and the stability are improved remarkably.

Figure 8:
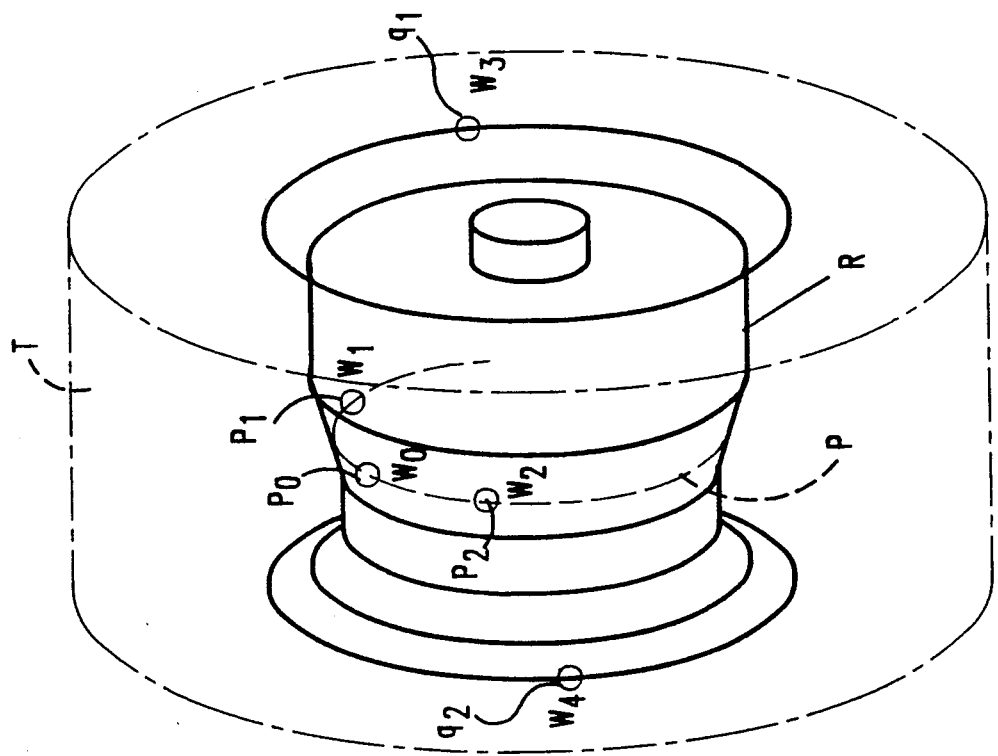
FIG. 8 is a diagram illustrating the correcting method in accordance with the second embodiment of the present invention.
Figure 7:
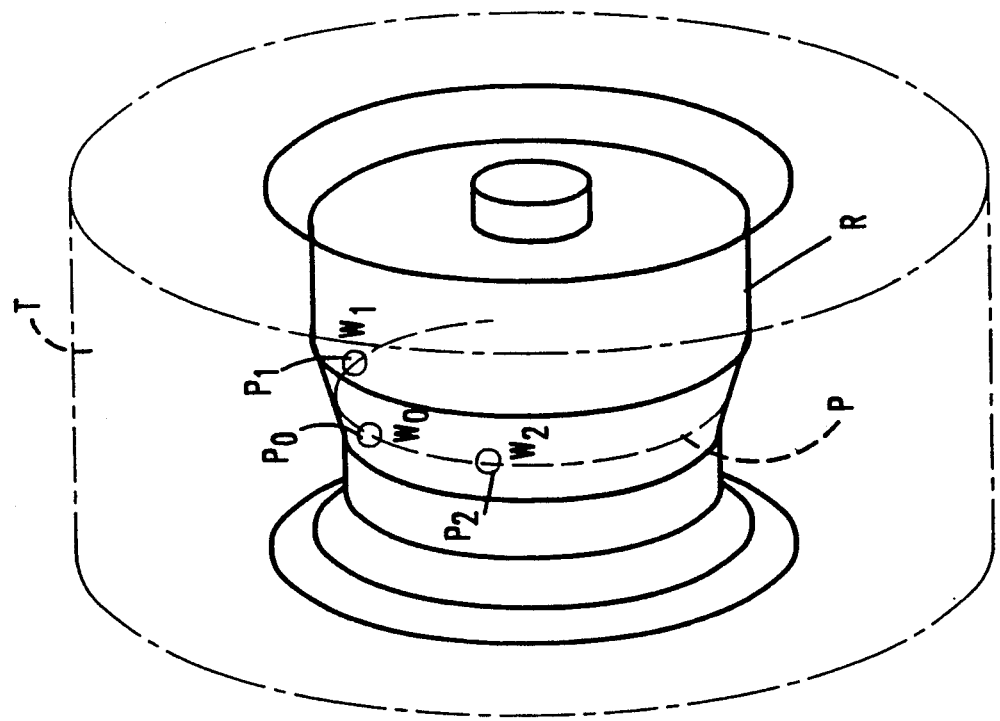
FIG. 7 is a diagram illustrating a correcting method in accordance with a second embodiment of the present invention.

FIGS. 7 and 8 show specific examples of a correcting method in accordance with a second embodiment of the present invention.

First, as shown in FIG. 7, an amount of unbalance W and a position $p_0$ where a balance weight is to be fitted on the outer periphery of the rim in the plane P are indicated by the unbalance measuring instrument. A balance weight $w_0$ whose weight is $\frac{1}{2}W$ is attached at this position $p_0$. Then, positions $p_1$, $p_2$ are set in such a manner as to be located symmetrically about a line extending between the center of the tire and the point $p_0$ in the plane P at an angle of 45° from the center of the tire. Weight balances $w_1$ and $w_2$ each having $\frac{3}{8}W$ are attached at these positions.

Finally, as shown in FIG. 8, an amount of dynamic unbalance is measured, and balance weights $w_1$ and $w_3$ are attached at positions $q_1$, $q_2$ on the flanges located on the obverse and reverse sides of the rim (widthwise opposite ends of the rim) so as to correct the amount of unbalance.

Specifically, in the case where the amount of static unbalance is 30 gr, the balance weight $w_0$ of 15 gr is attached at the position $p_0$ in the plane P, and the balance weights $w_1$, $w_2$ each having 11 gr are then attached at the positions $p_1$, $p_2$, thereby completing the correction of the amount of static unbalance. Finally, the amount of dynamic unbalance is measured, and the balance weights $w_3$, $w_4$ are attached on the obverse and reverse sides of the rim in its widthwise direction (widthwise opposite ends of the rim), thereby completing the overall weight correction.

Evaluation Using Actual Vehicles

A subjective (feeling) evaluation test was conducted by using actual vehicles. Two items were tested, steering performance and stability on both a dry road surface and a wet road surface.

Specifically, the high-speed straight advancing characteristic and the lane-changing behavior were tested, and the subjective test was conducted by using actual vehicles on the basis of 100 points with Comparative Example 1 serving as a control example, points greater than 100 indicating the direction of improvement.

The range of evaluation is such that a difference of five points allows a driver having ordinary driving skills to discern a difference in performance.

An overall evaluation was given by incorporating the evaluation of the aforementioned items on the wet road surface and riding comfort into the evaluation of the items on the dry road surface.

As test vehicles, the following two models were used.

Vehicle A: Nissan Skyline GTS-t (1989 Model), rim used: 61/2J×16, tire size: 205/55R16 88V.

Vehicle B: Volkswagen Golf GTI (1988 Model), rim used: 6J×14, tire size: 185/60R14 82H.

The method of correcting the unbalance of the weight of the rim-fitted tire is shown in Tables 7 and 8, in which Table 7 shows examples of tires for vehicle A, while Table 5 shows examples of tires for vehicle B.

TABLE 7

| Weight-balance fitting position | Specific Example 3 | | Comparative Example 2 | |
|---|---|---|---|---|
| | Angle (degree) | Weight (gr) | Angle (degree) | Weight (gr) |
| Tire 5 | | | | |
| Obverse side in the widthwise direction of the rim | 151 | 7 | 45 | 10 |
| Reverse side in the widthwise direction of the rim | 331 | 7 | 0 | 20 |
| Center in the widthwise direction of the rim | 61 (15 + 46) 15 −31 (15 − 46) | 10 14 10 | — | |
| Tire 6 | | | | |
| Obverse side in the widthwise direction of the rim | 133 | 13 | 100 | 20 |
| Reverse side in the widthwise direction of the rim | 313 | 13 | 0 | 15 |
| Center in the widthwise direction of the rim | 102 (60 + 42) 60 18 (60 − 42) | 8 12 8 | — | |

TABLE 8

| Weight-balance fitting position | Specific Example 4 | | Comparative Example 3 | |
|---|---|---|---|---|
| | Angle (degree) | Weight (gr) | Angle (degree) | Weight (gr) |
| Tire 7 | | | | |
| Obverse side in the widthwise direction of the rim | 117 | 8 | 80 | 15 |
| Reverse side in the widthwise direction of the rim | 297 | 8 | 0 | 10 |
| Center in the widthwise direction of the rim | 95 (50 + 45) 50 5 (50 − 45) | 7 10 7 | — | |
| Tire 8 | | | | |
| Obverse side in the widthwise direction of the rim | 142 | 4 | 30 | 10 |
| Reverse side in the widthwise direction of the rim | 322 | 4 | 0 | 15 |
| Center in the widthwise direction of the rim | 54 (12 + 42) 12 −30 (12 − 42) | 8 12 8 | — | |

It should be noted that the radial position (angle) where each balance weight was attached was measured counterclockwise as viewed from the reverse side of the rim-fitted tire mounted on the vehicle, and its origin was set as the position where the balance weight was attached on the reverse side of the rim in the case where both static and dynamic balances were corrected simultaneously. In the above tables, the comparative examples are those in which the static and dynamic balances were corrected simultaneously.

The results of the test conducted by mounting the above tires are shown in Table below.

TABLE 9

| Test Item | Vehicle A (Skyline) | Vehicle B (Golf) |
|---|---|---|
| High-speed straight advancing characteristic: | | |
| Specific Examples 3, 4 | 106 | 106 |
| Comparative Examples 2, 3 | 100 | 100 |
| Lane-changing behavior: | | |
| Specific Examples 3, 4 | 107 | 108 |
| Comparative Examples 2, 3 | 100 | 100 |
| Overall evaluation: | | |
| Specific Examples 3, 4 | 110 | 112 |
| Comparative Examples 2, 3 | 100 | 100 |

As can be seen from the above table, in both high-speed straight advancing performance and lane-changing behavior, the results of the test far surpassed the levels of the comparative examples, and it thus became evident that the method of the second embodiment brings about results of such a measure that the difference can be bodily sensed by ordinary drivers.

The advantage of the second embodiment is large, particularly in the overall evaluation which incorporates the performance on the wet road surface.

That is, as compared with the conventional method of correcting unbalance, with the tire corrected in accordance with the method of this embodiment, as the tire is rotated in contact with the ground after being mounted on the vehicle, horizontal and vertical vibrations occurring in the tire are reduced. As a result, a decline in lateral forces produced by the tire due to such vibrations can be suppressed, so that the steering performance and the stability are improved remarkably.

Figure 10:
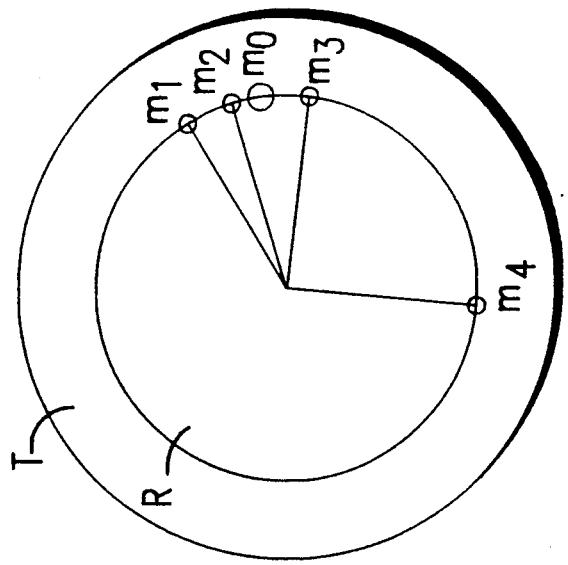
FIG. 10 is a diagram illustrating the correcting method in accordance with the third embodiment of the present invention.
Figure 11:
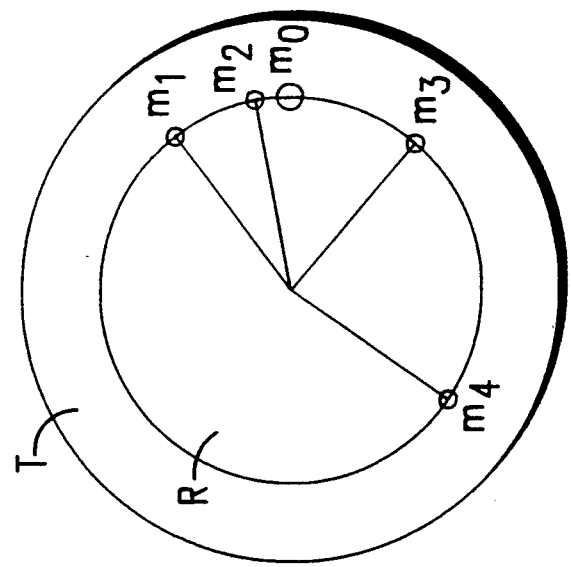
FIG. 11 is a diagram illustrating the correcting method in accordance with the third embodiment of the present invention.
Figure 9:
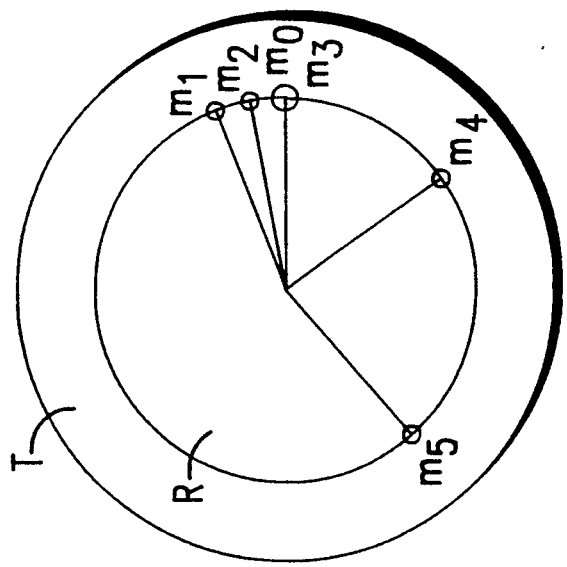
FIG. 9 is a diagram illustrating a correcting method in accordance with a third embodiment of the present invention.

Referring now to FIGS. 9 to 11, a description will be given of a third embodiment of the present invention.

FIG. 9 is a cross-sectional view of the rim taken along the plane P in a case where, for instance, the amount of static unbalance was 66 gr ($m_0$).

In this case, balance weights having weights of 35 gr, 20 gr, 15 gr, 10 gr, 10 gr ($m_1 - m_5$), respectively, are used on the basis of Tables 3 and 1.

In this case, the radial positions (angles) $\theta_1 - \theta_5$ where the respective balance weights are attached are respectively set at 19.5°, 9.5°, −0.2°, −55.2°, and −138.0°, and the respective balance weights are attached at these positions.

By attaching the balance weights in this manner, the centrifugal force which causes vertical vibrations becomes 0%, and the amount of dynamic unbalance in this case can be corrected by simply attaching 19 gr of a balance weight on component of moment which causes horizontal vibrations can be reduced to 54%.

In accordance with this embodiment of the invention, since the above-described arrangement is adopted, the variation of the centrifugal force occurring when the tire is rotated in contact with the ground can be reduced, so that the amount of vertical vibration of the tire can be reduced substantially, while the cause of horizontal vibrations can also be reduced substantially.

FIG. 10 is a cross-sectional view similar to FIG. 9, but in this example the amount of static unbalance was 46 gr.

In this case, four balance weights ($w_1 - w_4$) were used, and their weight ($m_1 - m_4$) was 25 gr, 15 gr, 10 gr, and 10 gr, respectively. Their attaching positions (angles $\theta_1 - \theta_4$) were calculated as 23.1°, 10.5°, −15.2°, and −98.0°, respectively.

FIG. 11 is also a similar example in which case the amount of unbalance was 32 gr.

In this case, four balance weights ($w_1 - w_4$) were used, and their weight ($m_1 - m_4$) was 20 gr, 15 gr, 10 gr, and 10 gr, respectively. Their attaching positions (angles $\theta_1 - \theta_4$) were calculated as 36.9°, 11.3°, −43.7°, and −126.5°, respectively.

Evaluation Using Actual Vehicles

A subjective (feeling) evaluation test was conducted by using actual vehicles. Two items were tested, steering performance and stability on both a dry road surface and a wet road surface.

Specifically, the high-speed straight advancing characteristic, behavior at the time of lane changing, behavior at the time of slalom, and circuit-running performance were tested. An overall evaluation was given by incorporating the evaluation of the aforementioned items on the wet road surface and riding comfort into the evaluation of the items on the dry road surface.

As test vehicles, the following two models were used.
Vehicle A: Nissan Skyline GTS-t (1989 Model), rim used: 61/2J × 16, tire size: 205/55R16 88V.
Vehicle B: Volkswagen Golf GTI (1988 Model), rim used: 6J × 14, tire size: 185/60R14 82H.

As a result of evaluation, as compared with the conventional method of correcting unbalance, with the tire corrected in accordance with the method of this embodiment, as the tire is rotated in contact with the ground after being mounted on the vehicle, horizontal and vertical vibrations occurring in the tire are reduced. As a result, a decline in lateral forces produced by the tire due to such vibrations can be suppressed, so that steering performance and stability are improved remarkably.

As described above, in accordance with the present invention, as compared with the case where the rim-fitted tire is mounted with the unbalance corrected in accordance with the conventional method, steering performance and stability as a whole are improved by such a measure that the difference can be discerned by drivers having quite ordinary driving skills. Thus, the method of correcting the unbalance in accordance with the present invention has an advantage in that, in particular, the road-surface holding performance of the tire is improved.

What is claimed is:

1. A rim-fitted tire with a weight unbalance corrected, comprising:
    at least two balance weights attached to an outer peripheral surface of a tire rim generally in a widthwise central portion of said rim so as to correct static unbalance; and
    an additional balance weight attached to of a widthwise end portion of said rim so as to correct both static and dynamic unbalances on the basis of an amount of dynamic unbalance measured with said at least two balance weights attached.

2. A rim-fitted tire with a weight unbalance corrected, comprising:

three balance weights, two of which are attached to an outer peripheral surface of a rim in such a manner as to be located in a plane substantially parallel with an equatorial plane of said rim-fitted tire defined at a substantially central position in a widthwise direction of said rim and to be located at substantially symmetrical positions spaced apart from each other at an angle of 40° to 50° as measured from a center of said rim-fitted tire, a central one of said balance weights having the heaviest weight being disposed between the other two of said balance weights, and said balance weights being arranged to correct static unbalance; and an additional balance weight attached to a widthwise end portion of said rim so as to correct both static and dynamic unbalances on the basis of an amount of dynamic unbalance measured with said balance weights attached.

3. A rim-fitted tire according to claim 2, wherein said central balance weight having the heaviest weight is attached to a measured unbalanced position, and the weight thereof is approximately one half of the total amount of unbalance corrected by said balance weights, while the weight of each of the remaining balance weights of said three balance weights is approximately one third of said total amount of unbalance.

4. A rim-fitted tire with a weight unbalance corrected, comprising:

at least two first balance weights which, on the basis of positions ($p_1$, $p_2$) of attachment of two virtual balance weights at widthwise opposite ends of a rim of said rim-fitted tire, and on the basis of the weights ($w_1$, $w_2$) of said two virtual balance weights that are calculated by an unbalance measuring instrument as well as a plane P substantially parallel with an equatorial plane of said rim-fitted tire defined at a substantially central position in the widthwise direction of said rim, are respectively attached at positions ($p_1'$, $p_2'$) of intersection between said plane P and lines extending from said positions ($p_1$, $p_2$) perpendicularly to said plane P in conformity with a surface of said rim, said first balance weights having respective weights equal to or less than the weights ($w_1$, $w_2$), respectively, of said virtual balance weights;

a second balance weight attached at a predetermined position in said plane P so as to correct an amount of static unbalance determined by means of one of: a balancer and calculation, with said first balance weights attached; and two third balance weights attached to the widthwise opposite ends of said rim, respectively, so as to correct dynamic unbalance on the basis of the amount of dynamic unbalance measured with all of said first and second balance weights attached.

5. A rim-fitted tire with a weight unbalance corrected, comprising:

a plurality of balance weights that are arranged consecutively in one direction starting with one having the heaviest weight, about a static unbalance correcting position in a plane substantially parallel with an equatorial plane of said rim-fitted tire defined at a substantially central position in a widthwise direction of a rim, so as to correct static unbalance; and an additional balance weight attached to a widthwise end of said rim so as to correct amounts of static and dynamic unbalances on the basis of an amount of dynamic unbalance measured with said plurality of balance weights attached.

6. A rim-fitted tire according to claim 5, wherein said plurality of balance weights comprise balance weights each having weight $m_n$ (gr) satisfying the following formulae:

$$m_n = 5 \times a \quad (a, n: \text{positive integers})$$

$$(m_{n-1}/2) + 5 > m_n > (m_{n-1}/2)$$

and two balance weights of 10 gr.

7. A rim-fitted tire according to claim 6, wherein if it is assumed that an origin indicated by a measuring instrument is set as $\theta = 0$, a counterclockwise direction is set as positive, and the weight of a balance weight indicated by said measuring instrument is $m_0$ (gr), the position of attachment of each of said plurality of balance weights is a position shown in Table 1 below with respect to an amount of static unbalance of 10 to 99 gr under the condition of

TABLE 1

| Amount of static unbalance $m_0$ (gr) | $\theta_1 = \cos^{-1}(m_0/2m_1)$ Balance-weight attaching position | | | | | |
|---|---|---|---|---|---|---|
| | $\theta_1$ | $\theta_2$ | $\theta_3$ | $\theta_4$ | $\theta_5$ | $\theta_6$ |
| 10–19 | $\cos^{-1}(m_0/20)$ | $60-\theta_1$ | | | | |
| 20–29 | $\cos^{-1}(m_0/30)$ | $41.4-\theta_1$ | $-82.8-\theta_1$ | | | |
| 30–39 | $\cos^{-1}(m_0/40)$ | $48.2-\theta_1$ | $-6.8-\theta_1$ | $-89.6-\theta_1$ | | |
| 40–49 | $\cos^{-1}(m_0/50)$ | $33.6-\theta_1$ | $7.9-\theta_1$ | $-75-\theta_1$ | | |
| 50–59 | $\cos^{-1}(m_0/60)$ | $41.4-\theta_1$ | $6.8-\theta_1$ | $-48.2-\theta_1$ | $-131-\theta_1$ | |
| 60–69 | $\cos^{-1}(m_0/70)$ | $29-\theta_1$ | $+19.2-\theta_1$ | $-35.7-\theta_1$ | $-118.6-\theta_1$ | |
| 70–79 | $\cos^{-1}(m_0/80)$ | $36.9-\theta_1$ | $-3.3-\theta_1$ | $-29-\theta_1$ | $-111.9-\theta_1$ | |
| 80–89 | $\cos^{-1}(m_0/90)$ | $25.9-\theta_1$ | $-18.1-\theta_1$ | $-43.8-\theta_1$ | $-23.3-\theta_1$ | |
| 90–99 | $\cos^{-1}(m_0/100)$ | $33.6-\theta_1$ | $-15.7-\theta_1$ | $-50.3-\theta_1$ | $-105.3-\theta_1$ | $0.3-\theta_1$ |

8. A method of correcting weight unbalance of a rim-fitted tire, comprising the steps of:

defining a plane P substantially parallel with an equatorial plane of said rim-fitted tire at a position on the rim thereof which is substantially central with respect to the widthwise dimension thereof;

measuring an amount of static unbalance W of said rim-fitted tire and a position $p_0$ at which a balance weight is to be attached, in said plane P;

attaching a weight $w_0$ having a weight of approximately one half of W, to said position $p_0$, and attaching balance weights $w_1$, $w_2$ each having weights of approximately one third of W, on respective sides of said position $p_0$ within said plane P, at substantially symmetrical positions $p_1$, $p_2$ spaced apart from each other at respective radial angles of approximately 40° to 50° as measured from the radial center of said rim-fitted tire, in order to correct static unbalance;

measuring dynamic unbalance; and attaching a balance weight on each of the widthwise opposite ends of said rim.

9. A method of correcting weight unbalance of a rim-fitted tire, comprising the steps of:

measuring positions ($p_1$, $p_2$) of attachment of two virtual balance weights at widthwise opposite ends of a rim of said rim-fitted tire, and determining the weights ($w_1$, $w_2$) of said two virtual balance weights by means of an unbalance measuring instrument;

defining a plane P substantially parallel with an equatorial plane of said rim-fitted tire at a substantially central position with respect to the widthwise dimension of said rim;

attaching at least two first balance weights at positions ($p_1'$, $p_2'$) of intersection between said plane P and lines extending from said positions ($p_1$, $p_2$) perpendicularly to said plane P in conformity with a surface of said rim, each of said first balance weights having weight equal to or less than the respective weights ($w_1$, $w_2$) of said virtual balance weights;

determining an amount of static unbalance by means of one of: a balancer and calculation, with said first balance weights attached, and attaching a second balance weight at a predetermined position in said plane P so as to correct static balance; and measuring an amount of dynamic unbalance and attaching two third balance weights at the widthwise opposite ends of said rim, respectively, so as to correct the amount of dynamic unbalance.

10. A method of correcting weight unbalance of a rim-fitted tire, comprising the steps of:

defining a plane P substantially parallel with an equatorial plane of said rim-fitted tire at a substantially central position with respect to the widthwise dimension of said rim;

measuring a correcting position $p_0$ for attachment of a virtual balance weight $w_0$ and the weight $m_0$ of said virtual balance weight in said plane by means of a static-unbalance measuring instrument;

attaching a balance weight $w_1$ at a position offset from said corrected position, said balance weight $w_1$ having a weight $m_1$ of not less than half the weight $m_0$ of said virtual balance weight;

attaching a balance weight $w_2$ at a position symmetrical about said correcting position $p_0$ for attachment with respect to the position where said balance weight $w_1$ is attached, said balance weight $w_2$ having weight $m_2$ of not less than the weight of said balance weight $w_1$;

consecutively attaching a plurality of balance weights $m_n$ in the above manner such that said balance weights $m_n$ include balance weights each having weight $m_n$ (gr) satisfying the following formulae:

$$m_n = 5 \times a \quad (a, n: \text{positive integers})$$

$$(m_{n-1}/2) + 5 > m_n - 1/2)$$

and two balance weights of 10 gr, said plurality of balance weights being arranged in said plane P consecutively in one direction starting with the one having the heaviest weight, so as to correct static unbalance; and attaching a balance weight for correcting an amount of dynamic unbalance.

* * * * *

UNITED STATES PATENT AND TRADEMARK OFFICE
CERTIFICATE OF CORRECTION

PATENT NO. : 5,120,113

DATED : June 9, 1992

INVENTOR(S) : Toshiharu OYAMA et al.

It is certified that error appears in the above-identified patent and that said Letters Patent is hereby corrected as shown below:

On title page, item [54] and col. 1, line 2, change "CORRECTIN31EIGHT" to --CORRECTING WEIGHT--.

Signed and Sealed this

Fifth Day of July, 1994

Attest:

BRUCE LEHMAN

*Attesting Officer*   *Commissioner of Patents and Trademarks*